July 1, 1947. H. A. HAMBERGER 2,423,312
CHUCK ADJUSTING DEVICE
Filed Sept. 12, 1944 3 Sheets-Sheet 2

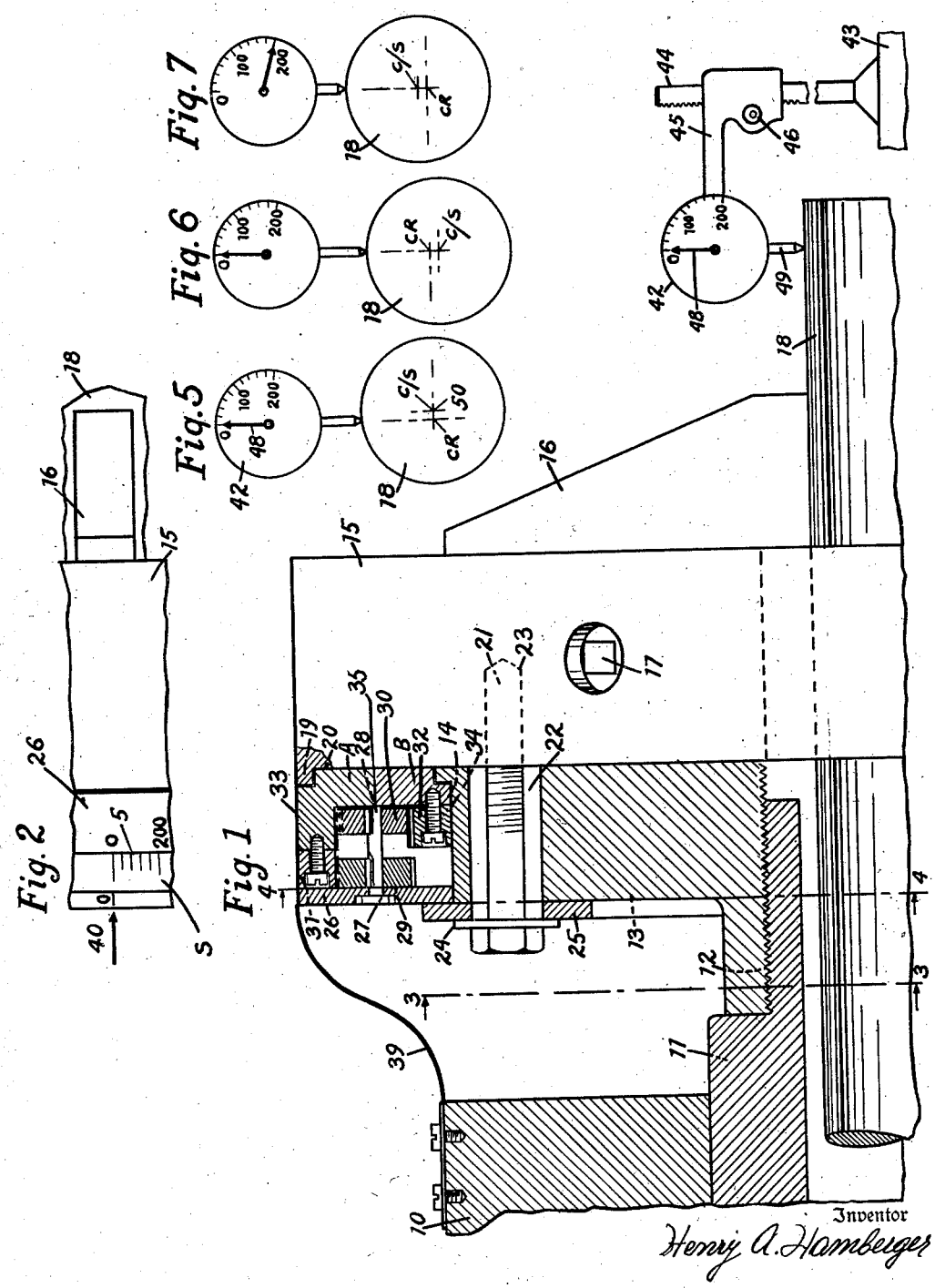

Inventor
Henry A. Hamberger

Inventor
Henry A. Hamberger

Patented July 1, 1947

2,423,312

UNITED STATES PATENT OFFICE 2,423,312

CHUCK ADJUSTING DEVICE

Henry A. Hamberger, Rochester, N. Y.

Application September 12, 1944, Serial No. 553,788

4 Claims. (Cl. 279—6)

The present invention relates, in general, to a method, and means, for effecting precise adjustments in machine tools and the like, and has more particular reference to a method, and means, for simply, quickly, and accurately, precisely adjusting work piece holding devices such as chucks on lathes, and like machine tools.

In operating machine tools, such as lathes, and performing precise operations on work pieces, it is essential that the work piece be accurately centered on the axis of rotation of the lathe spindle. To this end in view, chucks may be employed, that are of the non-universal type, and in which the gripping jaws are separately adjustable. With such chucks, it is a lengthy and skillful operation, of trial and error, to accurately center a work piece.

With a universal chuck, in which the gripping jaws are mechanically controlled to move together, much time is saved, but only at the expense of accuracy. Such chucks, even when new, are not extremely accurate, and after some use, are much too inaccurate for precise work. Furthermore, if accurate for one size of work piece they are more than likely to be inaccurate for other sizes of work pieces. It is of course, possible, to center the work piece by taking a more or less deep cut thereoff. But this is wasteful of time and material, and, in the case of cylindrical bar stock that is accurately cylindrical and highly polished, a subsequent polishing operation must be performed.

With the above, and other considerations in mind, it is proposed, in accordance with the present invention, to provide a method and means for quickly centering a work piece gripped in a universal chuck, by bodily moving the chuck head on its carrying flange, whereby the chuck will thereafter accurately center all stock of exactly the same size, regardless of inaccuracies otherwise in the chuck. This is particularly advantageous when a large number of pieces of the same size of stock, as 2", 3", etc., of highly polished cylindrical bar stock, are to be machined in succession.

More specifically, means in the form of two eccentric rings, are provided, with means to rotate the rings, oppositely, and simultaneously, in equal amount, whereby to move the chuck head on its flange, after its supporting bolts have been loosened. The ring movement is in accordance with a graduated scale on one of the rings, and the extent of movement is in accordance with a direct reading from a usual eccentricity dial gauge.

Further objects, purposes, and characteristic features, of this invention, will appear as the description progresses, reference being made to the accompanying drawing, showing, in a wholly diagrammatic manner, and in no way in a limiting sense, one form which the invention can assume. In the drawings:

Fig. 1 is a partial side elevational view of the embodiment of the invention, with parts shown in section.

Fig. 2 is a fragmentary top plan view.

Figs. 5, 6 and 7, are diagrammatic views of different stages of a gauging operation.

Figure 4:
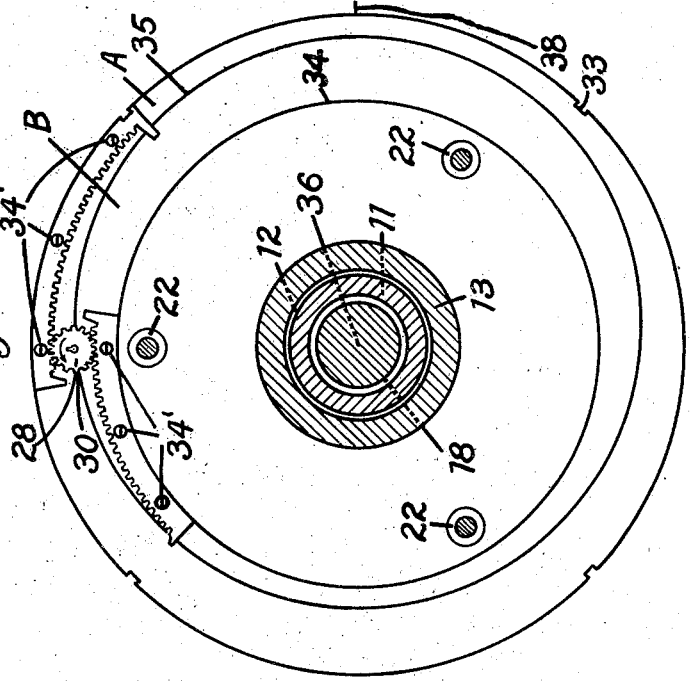
Fig. 4 is a sectional view, on line 4—4 of Fig. 1, viewed in the direction of the arrows.
Figure 3:
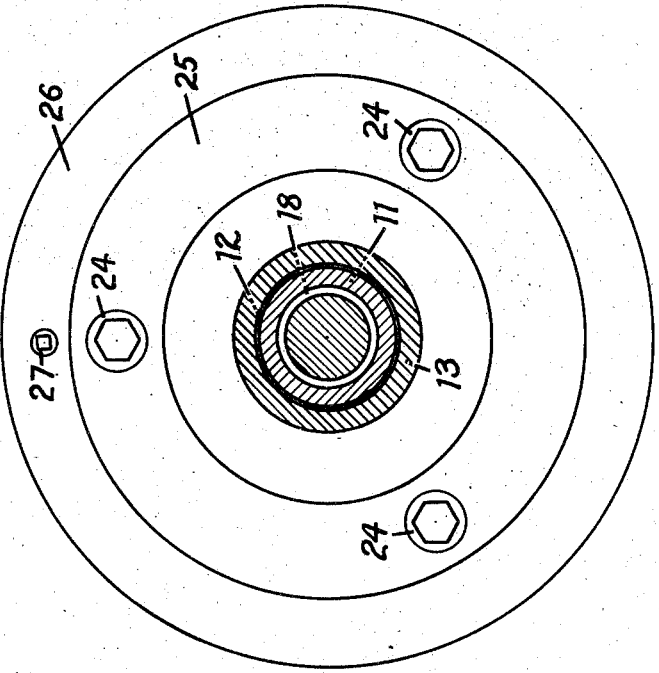
Fig. 3 is a section view, on line 3—3 of Fig. 1, viewed in the direction of the arrows.

Referring now to the drawings, and first to Fig. 1, there is there shown, in fragmentary form, parts of a metal working lathe, equipped with one form of the present invention. The lathe has a frame 10, in which rotates a spindle 11, threaded at one end, as at 12, to receive a chuck carrying flange 13. The flange, and this should be borne in mind, has a periphery 14, which is concentric with the axis of rotation of the lathe spindle which carries the flange, and adjustable thereon, is a chuck head, of the universal type, having jaws 16, operable together, by a wrench receiving headed stem 17. Shown as received in the jaws 16, is a work piece 18, shown as in the form of accurately formed and polished cylindrical bar stock. The chuck head carries an inwardly projecting flange, or lip, 19, with a face 20 which is concentric with the spindle axis of rotation, when in the position shown in Fig. 1.

As clearly shown in the drawings, the chuck head is adjustably held to the flange, by bolts, as 21, passing through enlarged holes 22, in the flange and received in threaded openings, as 23, in the chuck head. Beneath the bolt heads, are spring washers, as 24, and a continuous annular holding ring, 25.

The holding ring 25 operates to retain in position an annular ring 26, which serves as a bearing for a pinion stem 28, with pinions 29 and 30 fastened thereto.

Wrench means, such as a square hole recessed into the head of the pinion stem 28, is provided for rotating the stem and the pinions.

The pinions 29 and 30 engage, respectively, with teeth of sectors 31 and 32, which sectors are held in place on respective outer and inner adjusting rings A and B, by screws, or the like 34'.

These rings A and B, are received between the concentric flange periphery 14, and the circular, and, as shown in Fig. 1, concentric face 20 of flange 19. The rings are L shaped in section, the ring A having an outer face 33, and the ring B an inner face 34, which are accurately circular, and, in the positions shown in Fig. 1, are concentric with the axis of rotation of spindle 11.

The two rings A and B are in contact, throughout 360°, with each other, at their inner faces, at 35, and these faces meet, as clearly shown in Fig. 4, on a circle that is eccentric to the axis of rotation of the spindle.

In this Fig. 4, can be clearly seen, the two adjusting rings, the degree of eccentricity of circle 35 being much exaggerated, in the drawing, in order to facilitate an understanding of the invention. The faces 33 and 34 are shown as concentric with the axis of rotation 36 of the spindle, when the rings are so positioned as to cause their eccentricities to offset each other. As shown, the eccentricity axes of both A and B lie on the line 38, or, in other words, the widest and the narrowest, parts, of each ring, lie on line 38. This condition exists when a zero mark on the scale S on ring A, is opposite a mark "0", on the pinion ring 26. The pinions 29 and 30 are so designed as to move the rings, simultaneously, in opposite directions, at exactly the same rate. Thus, to position the two rings to have their eccentricities on the same axis, it is merely necessary to operate the pinion shaft 28, by means of a suitable tool, until the zero marks on ring A and pinion ring 26, are accurately in registry.

Carried on the lathe frame is a fixed pointer 39, positioned with its point 40 adjacent ring 26, and in a vertical plane passing through the axis of rotation of spindle 11.

With the rings A and B relatively adjusted, by means of pinion shaft 28, if it be desired to place the common eccentricity axis of the rings in a horizontal plane, (as in Fig. 4), it is merely necessary to loosen the holding bolts 21, to a slight degree, and then, as by means of a spanner wrench, move the pinion ring, pinions, and rings A and B, to position the zero marks accurately in registry with the frame pointer 39.

It can be readily appreciated from what has been said above, and from a consideration of Fig. 4, just how the rings A and B can be operated to adjust a work piece held in the chuck jaws. The two rings A and B are supported on the concentric flange face 14, and the chuck head 15 is supported on the two rings, by means of its concentric face 20. It is obvious that by moving the rings relatively to each other, a camming action is exerted on the chuck head and it can be moved relatively to its supporting flange, assuming, of course, that bolts 23 have been just slightly loosened.

With the parts positioned as shown in Fig. 4, if the pinion shaft 28 be rotated counterclockwise, ring A turns counterclockwise, and ring B, clockwise, exactly the same angular distance. Movement of ring A moves the head, with respect to the flange, and of course to the axis of rotation of the lathe spindle vertically downwardly, and horizontally to the left. Ring B, however, moves the head vertically downwardly and horizontally to the right. Thus the sidewise movements, in the horizontal directions, offset each other, and the net result is that the work piece is moved downwardly and directly in line with the fixed pointer head 40.

Accordingly, as appears from the above, if a cylindrical work piece, as 18, held in the jaws 16 of the chuck, is eccentric to the axis of rotation of spindle 11, and is positioned to have its high point accurately positioned at the top, in line with pointer head 40 and rings A and B, and pinion ring 26 be positioned as shown in Fig. 2; and the amount of eccentricity be known, it is a very simple matter to shift the chuck head on the flange so as to accurately center the work piece. To thus measure the eccentricity, and thus position the work piece, a usual eccentricity dial gauge, 42, is employed.

As shown in Fig. 1, the gauge can be carried by a support 43, resting on the lathe bed, by means of a rod 44, slidably carrying a bracket 45, adjustable on the rod as by a screw 46. The gauge has a dial with graduations 49, readable, for example in thousandths of inches, and includes a pointer 48 and an operating plunger 49. The gauge reads "0" when the plunger is free.

One method for using the gauge is illustrated in Figs. 5–7 as follows: The work piece 18, clamped in the chuck jaws, is shown as being eccentric to the axis of rotation of the spindle, the center of the stock, at 50, lying to the right of the center of rotation, CR, of the spindle.

The gauge is applied to the work piece, as the chuck is slowly rotated, and the gauge reading retained at "0," by adjusting the gauge position, meanwhile retaining the plunger 49 in contact with the work piece, until a position is reached, as in Fig. 6. In this position, with the gauge held stationary, any movement of the work piece, in either direction causes a deflection of the pointer. It is then known that the work piece is accurately positioned with its low point on top and in line with the pointer head 40.

The gauge is then held in fixed position, and the work piece rotated to the position to give the maximum reading, as at Fig. 7, of "200," i. e. .200". It is then known that the high point of the work piece is on top, and in line with the pointer head 40, and that double the eccentricity, is equal to .200", since the gauge reads twice the eccentricity, which, of course, is twice the necessary adjustment required to accurately center the work piece.

The scale S, on the outer ring A, is graduated, to read in thousandths of inches and opposite each angular distance of movement necessary for one ring to move the work piece vertically downwardly, a given number of thousandths of inches, is placed the number equal to four times this given number. More specifically, the distance on ring A scale S, labelled 200 is the distance ring A must be moved from its "0" position to effect an adjustment of 50 thousandths of an inch (.050"), vertically downwardly, of the work piece. Since the effects of the two rings A and B, are additive and equal, in this direction, movement of ring A from 0 to 200, produces an adjustment of two times one quarter of .200", or .100". Thus, with a dial reading of 200, equal to .200", the eccentricity is .100", and by moving ring A to read the same as the gauge reading, the work piece is accurately centered on the axis of rotation of the lathe spindle.

To illustrate the invention on drawings of not too large a size, the figure of .200", etc., given above, is at least ten to twenty times as large as would ordinarily be met with, in practice.

Figure 9:
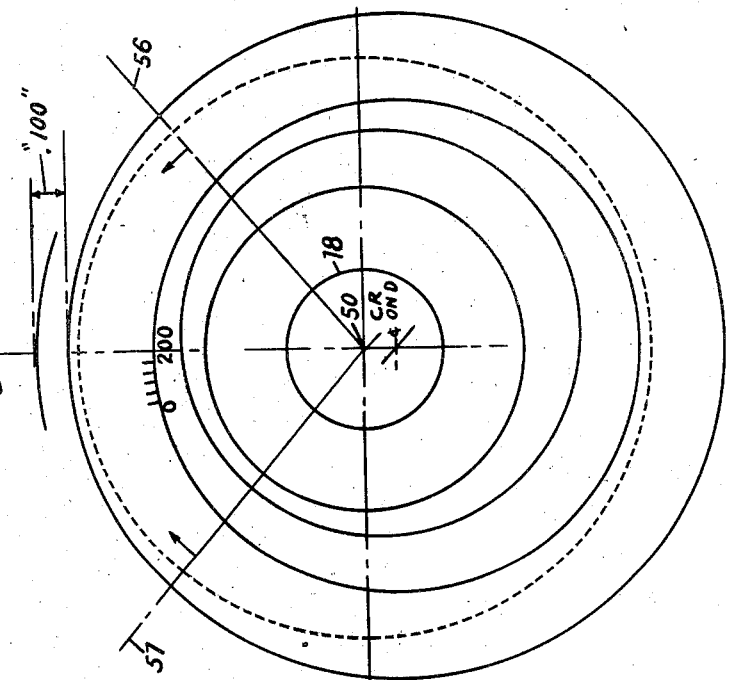
Fig. 9 is a wholly diagrammatic showing of a second operative phase of the invention.
Figure 8:
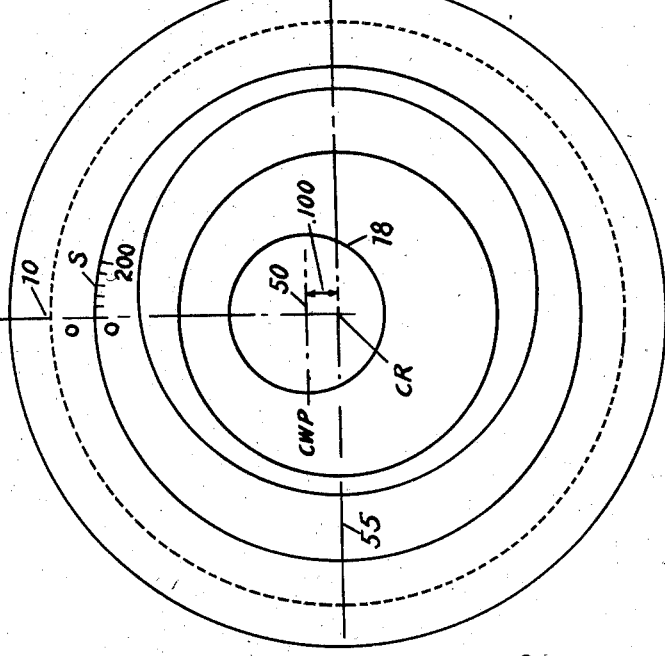
Fig. 8 is a wholly diagrammatic showing of one of the operative phases of the invention.

The procedure, thus, of accurately centering a work piece, is simple, direct and precise, as illustrated, wholly diagrammatically, in Figs. 8 and 9.

In Fig. 8, is shown the work piece 18, positioned, as described above, with its high point on top, and directly in line with pointer head 40. The holding bolts 21, are then slightly loosened and by means of the differential pinions 29 and 30, the "0" on scale S is brought into registry with the "0" on the pinion ring, and, by means of a usual spanner wrench, or the like, the rings are all turned to bring the "0" marks into registry with pointer head 40. This condition is shown in Fig. 8. All that is now required, is to turn the pinions until the gauge reading of .200" on scale S, is brought into registry with the "0" mark on the pinion ring. Then the holding bolts 21 are tightened, and it is assured that the work piece 18, and all other work pieces of the same size, will be accurately centered, with the utmost precision.

In Fig. 9, with the adjustment completed, it can be seen that the eccentricity of .100" has been accurately eliminated. The axes of eccentricities of ring A and B, which in Fig. 8 both lay on the horizontal line 55, have, as in Fig. 9, been shifted; that of ring A moving counter clockwise to line 56, and that of ring B moving clockwise, to line 57, and the center of the work piece 50 lies on the center of rotation, CR, of the lathe spindle.

When a different size of bar stock is to be used, it is merely necessary to make another simple adjustment, as described above.

The scale S, on ring A, is not graduated uniformly but varies in accordance with a sine curve, which sine curve varies with the degree of eccentricity of the rings A and B.

As set forth above, the eccentricity has been greatly exaggerated, in the drawings. While, in practice, it can vary widely, in accordance with requirements, in one case, in actual practice, with rings having inner and outer diameters of about 6", the degree of eccentricity used is .060", i. e., about 1%. Also, the sectors 31 and 32, while in this case, are such as to cover about 45° of movement, can be varied widely, in cases so requiring. With such proportions, each ring, moving 45°, can correct for ½ the eccentricity, and thus both rings can adjust for the total eccentricity, or .060" and so can care for a dial gauge reading of .120".

In the above description, reference has been made to vertical and horizontal planes, lines, and axes, but the invention is in no way limited by such terminology. It is merely necessary that the relative positions of the various parts, be as described, and quite regardless of the orientation of the system, as a whole.

The above rather specific description of one form of the present invention is given solely for the purpose of illustration, and in no manner in a limiting sense. It is to be clearly understood, that various modifications, alterations, and adaptations, can be made, from time to time, as may be dictated by conditions and requirements, without departing from the spirit or scope of this invention, except insofar as limited by the scope of the appended claims.

Having described my invention, I now claim:

1. In an adjusting means for lathe chucks and the like, in combination; a driven spindle; a chuck flange fixed to the spindle, the periphery of the flange being concentric with the rotation axis of the spindle, an adjustable inner ring member rotatively mounted on the concentric chuck flange and having an eccentric outer periphery; an outer adjustable ring member rotatively mounted on the eccentric periphery of the inner ring member, and with its outer periphery concentric with the flange periphery when the ring members are adjusted to normal position; a universal chuck head adapted to hold a work piece rotatively mounted on the outer ring member, concentric with the periphery of this ring member; releasable means for clamping the chuck head to the flange in various adjusted positions of the chuck head; and means, operable to simultaneously rotate the inner and outer ring members in opposite directions and at the same angular rate to thereby impart to the chuck head and work piece movement of translation at right angles to the axis of rotation.

2. In adjusting means for lathe chucks and the like, in combination; a driven spindle, a chuck flange fixed to the spindle, the periphery of the flange being concentric with the rotation axis of the spindle; an inner ring member, rotatively mounted on the concentric chuck flange and having an eccentric outer periphery; an outer ring member rotatively mounted on the eccentric periphery of the inner ring member, and with its outer periphery concentric with the flange periphery when the ring members are adjusted to normal position; a universal chuck head adapted to hold a work piece rotatively mounted on the outer ring member and concentric with the periphery of this ring member; releasable means for clamping the chuck head to the flange in various adjusted positions of the chuck head; a gear section on the inner and on the outer ring members and a pinion member to simultaneously rotate the ring members in opposite directions at the same angular rate, to thereby impart to the chuck head and work piece movement of translation at right angles to the axis of rotation.

3. In adjusting means for lathe chucks and the like, in combination; a driven spindle, a chuck flange fixed to the spindle, the periphery of the flange being concentric with the rotation axis of the spindle, an adjustable inner ring member rotatively mounted on the concentric chuck flange and having an eccentric outer periphery, an outer adjustable ring member rotatively mounted on the eccentric periphery of the inner ring member, and having an outer periphery which is eccentric with its inner ring surface which is resting on the periphery of the inner ring member, a universal chuck head rotatively mounted on the outer ring member and concentric with the outer periphery of this ring member; releasable means for clamping the chuck head to the flange in various adjusted positions of the chuck head; toothed sectors on the rings respectively, a pinion ring, a pinion shaft trunnioned in the pinion ring and pinions on the shaft engaging respectively with the sectors, the pinions being proportioned to turn the outer and inner rings in opposite directions at the same angular rate, a zero mark on the pinion ring, a scale on one adjusting ring running up from a zero mark thereon, a zero mark on the other adjusting ring, the zero mark on the pinion ring being so positioned that when it registers with the zero marks on said adjustable rings, the eccentricities of the adjusting rings are in alignment but opposite to each other, and wrench receiving means to rotate the pinion ring, pinions and eccentric rings in unison, relative to the chuck head, to thereby position these adjusting means relative to a work piece in the chuck head.

4. In adjusting means for lathe chucks and the like, in combination, a driven spindle, a chuck flange fixed to the spindle, the periphery of the flange being concentric with the rotation axis of the spindle; a universal chuck head; means for clamping the chuck head in various adjusted positions; an adjustable inner ring member rotatively mounted on the concentric chuck flange and having an eccentric outer periphery; an outer adjustable ring member rotatively mounted on the eccentric periphery of the inner ring member and with its outer periphery concentric with the flange periphery when the ring members are adjusted to normal position; toothed sectors on the ring members respectively, a pinion ring, a pinion shaft trunnioned in the pinion ring and pinions on the shaft engaging respectively with the sectors, the pinions being proportioned to turn the outer and inner rings in opposite directions at the same angular rate, a zero mark on the pinion ring, a scale on one adjusting ring running up from zero, the zero mark on the pinion ring being so positioned that when it registers with the zero mark on said one adjusting ring, the eccentricities of the adjusting rings lie on the same axis and opposite to each other; a frame carrying the spindle, a pointer on the frame terminating adjacent the pinion ring, and wrench receiving means on one of the rings for moving all the rings as a unit and bringing the two zeros into registry with the pointer, the scale on said one adjustment ring having the various distances from its zero marked with values four times as great as the adjustment of the chuck on the flange at right angles to the common eccentricity axis that is effected by moving the rings any of said various distances.

HENRY A. HAMBERGER.

REFERENCES CITED

The following references are of record in the file of this patent:

UNITED STATES PATENTS

| Number | Name | Date |
|---|---|---|
| 984,000 | Hull | Feb. 14, 1911 |
| 733,983 | Reisner | Nov. 1, 1904 |
| 826,971 | Stowell | July 24, 1906 |
| 2,088,187 | Dempsey | July 27, 1937 |

FOREIGN PATENTS

| Number | Country | Date |
|---|---|---|
| 363,869 | Germany | 1922 |
| 60,084 | Austria | 1913 |
| 460,696 | Great Britain | Feb. 2, 1937 |